Dec. 28, 1943.  G. A. PETROE  2,337,921
VENTURI METER AND METHOD OF MEASURING LIQUIDS FLOWING THROUGH IT
Filed Dec. 27, 1940
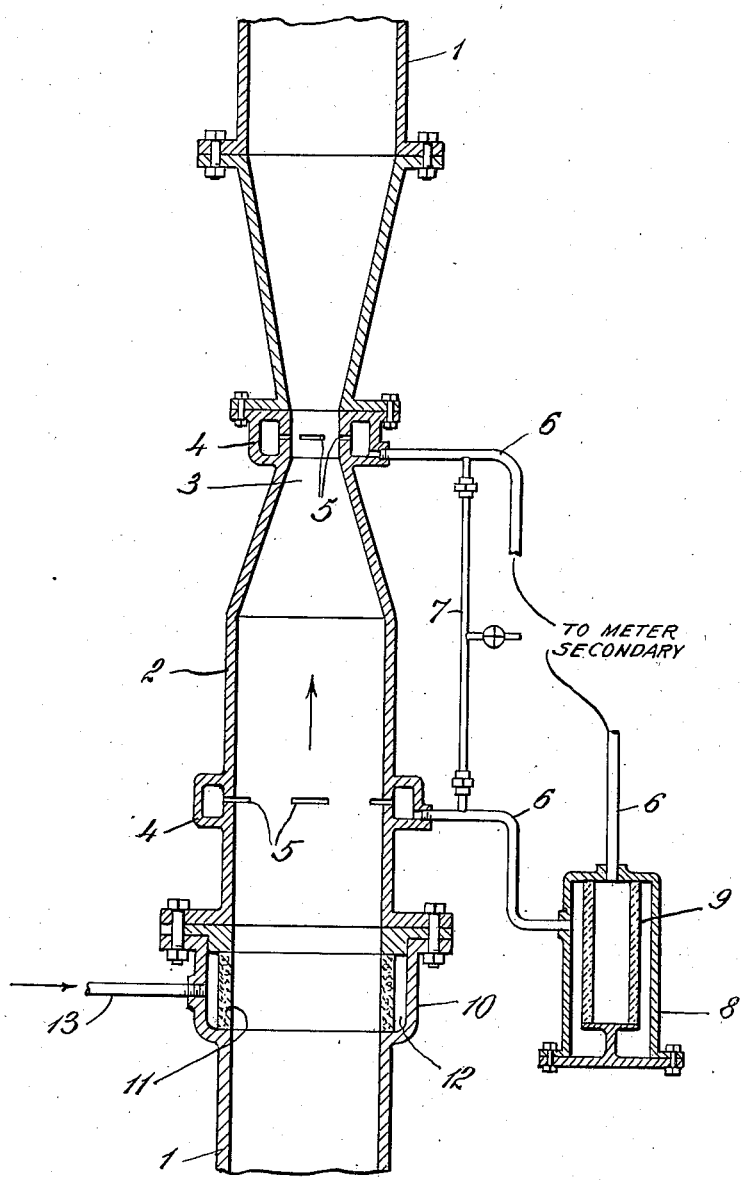
INVENTOR
GREGORY A. PETROE
BY
ATTORNEYS Patented Dec. 28, 1943

2,337,921

UNITED STATES PATENT OFFICE 2,337,921

VENTURI METER AND METHOD OF MEASURING LIQUIDS FLOWING THROUGH IT

Gregory A. Petroe, Niagara Falls, N. Y., assignor to The Mathieson Alkali Works, Inc., New York, N. Y., a corporation of Virginia Application December 27, 1940, Serial No. 371,915

7 Claims. (Cl. 73—213)

This invention relates to Venturi meters and their operation, its object being to increase the accuracy and efficiency of such meters especially when used to measure the flow of liquids carrying suspended solids, particularly fibrous solids. Although the invention has found its greatest usefulness in the measurement of paper pulp flow and will be described in connection with that use, the principles involved are applicable to other suspensions and to liquids generally.

The principle of a Venturi meter is old and well known. If a pipe through which a liquid is flowing is constricted the linear rate of flow at the constriction or Venturi throat is accelerated and the pressure diminished. As the pressure difference is a factor of the rate of flow, the rate of flow and hence the quantity of liquid passing through a pipe of known size can be determined if this pressure difference is known. To measure it the pipe is tapped by impulse or pressure ports at and beyond the throat and connected to a differential pressure gauge which may be suitably calibrated. Although such meters are satisfactory enough when used to measure true liquids, they are not so satisfactory for measuring liquid suspensions. Thus, when a Venturi meter is used to measure the flow of paper pulp stock, or similar suspension, two things conspire to vitiate the accuracy of the meter readings. One is that variation in fiber content and pulp consistency alters the friction factor of the liquid so that a difference in pressure drop is indicated without sensible variation in liquid flow. The other is that fibers tend to lodge in the impulse connections and produce fictitious meter readings.

I have largely overcome these difficulties by introducing a film of water into the pipe on the upstream side of the Venturi. This film, introduced under a pressure slightly in excess of the pulp pressure, forms about the flowing column of pulp a lubricating envelope of standard friction value and causes a substantially uniform coefficient of friction to be maintained between the walls of the nozzle and the flowing stream lodging in the impulse connections. I have successfully introduced this lubricating film through a ring of porous material, such as carbon, carborundum or porous stoneware, having the same inside diameter as the piping and inserted in the pipe on the upstream side of the Venturi nozzle.

The impulse ports ordinarily consist of rows of round holes in the Venturi nozzle leading to piezometer rings the holes in each row being peripherally spaced so that the average velocity over different parts of the flowing column is measured. It is relatively easy for pulp fibers to enter these round ports and plug the impulse connections, and although the use of a lubricating film lessens the likelihood of this happening, I have still further guarded against it, without impairing the efficiency of the meter, by changing the form of these holes; making them in the form of narrow slots of such length that an area equivalent to the standard round hole is presented. The entrance of fibers into the impulse connections is thus discouraged, because most of the passing fibers will bridge the narrow dimension of the slots and only those fibers, relatively few in number, whose axes are presented lengthwise of the slots and which are unsupported by transverse fibers, will normally be able to enter the ports.

When measuring pulp flow in a Venturi meter of standard design, all horizontal sections of the impulse connections drain to the Venturi body through the impulse ports when the flow stops. When the flow is resumed there is a tendency for the fibers to enter the impulse connections before the flush water builds up. To obviate this, as far as possible, I lead each impulse connection into its piezometer ring below the level of the impulse ports. Thus drainage is limited to the amount of liquid above the ports. Consequently when pulp flow is again resumed the flush water introduced into the impulse connections can be quickly built up to continue the movement of clear water through the impulse ports to the pulp and the likelihood that fibers will be entrained in the impulse connections is reduced.

It is standard practice to install a sump at the bottom of the impulse lines so as to catch dirt or scale by gravity separation. I install a screen or porous tube in this sump of sufficient area so that the resistance offered to fluid flows is negligible, while designed so as to entrain any fiber going to the meter secondary.

I have illustrated a preferred embodiment of my invention in the accompanying drawing, the single figure of which shows a longitudinal section through the nozzle and adjacent piping of a Venturi meter equipped with the various improvements of my invention. In this drawing 1 represents the pipe through which the liquid to be measured flows. Constituting a part of this pipe is a Venturi nozzle 2 provided with a constriction or throat 3 of generally conventional form. Encircling the nozzle at the throat and at a distance from it on the upstream side are piezometer rings 4 communicating through slotted impulse ports 5 with the interior of the nozzle, and through impulse connections 6 with the meter secondary. The length of each of these slotted ports is several times its width, but the area of each is substantially the same as that of the standard round hole that each replaces. For example, if a hole three-sixteenths of an inch in diameter would be standard, each slotted port is made one thirty-second wide and seven-eighths of an inch long. The ports 5 are disposed, each with its narrower dimension parallel to the axis of the venturi. The impulse connections enter the piezometer rings below the level of the impulse ports, and are continuously supplied with flush water through the piping 7 while the meter is operating. The impulse connections are each provided with a fiber trap comprising a sump 8 in which is mounted a porous cylindrical tube 9, the interior of which communicates directly with a branch of the impulse connections leading to the meter secondary.

The pipe 1 is immediately adjacent the upstream end of the nozzle 2 is provided with a bell 10 in which is inserted a porous ring 11 made of carbon, carborundum or porous stoneware. The inside diameter of this ring is the same as that of the inside diameter of the pipe 1, the thickness of the ring being such as to leave an annular space 12 between it and the inner wall of the bell 10. Liquid under pressure is fed to the space 12 by a pipe 13 and through the porous ring 11 to the interior of the pipe 1.

In operation the suspension to be measured, as for example paper pulp, flows in the direction of the arrow through pipe 1 and the Venturi nozzle 2. As it passes the ring 11 it picks up a lubricating envelope consisting of a film of liquid, usually water, forced through the pores of the ring. This lubricating envelope practically eliminates variations in frictional resistance to flow due to variations in solid content of the suspension and also minimizes deposition of solids on the walls of the nozzle, particularly over the impulse ports. Entry of fibers into these ports, in the case of paper pulp, is further minimized by virtue of the shape of the ports. A certain unavoidable minimum does, however, find its way into the impulse lines and ultimately to the sump 8 where it is trapped. The relatively large peripheral area of the porous cylinder 9 while preventing the passage of fibers is sufficiently large to offer only a negligible resistance to the passage of liquid. When flow is discontinued the only drainage from the impulse ports back into the nozzle is that of the liquid in the piezometer rings above the level of those ports. The lower part of the piezometer rings and the horizontal branches of the impulse connections remain filled with water and do not drain. On resumption of flow, the flush water quickly builds up, and there is, therefore, little tendency for fibers to be forced outward through the ports and into the piezometer rings and impulse connections.

Although the lubricating envelope eliminates or greatly reduces variations in frictional resistance to flow due to variation in the solid content of suspensions being measured, it acts similar with reference to variations in frictional resistance to flow due to pipe line disturbances, such as rough piping, projecting flange gaskets, elbows, etc., thus standardizing the friction value of the flowing liquid, so that the column passes the impulse ports at a uniform velocity throughout. This makes for greater accuracy of measurement, the velocity at each impulse port of a given piezometer ring being the same as at the other ports of that ring.

I claim:

1. A Venturi meter for measuring the flow of liquids carrying suspended solids comprising a pipe, a nozzle having impulse ports in the pipe, and means in the wall of the pipe on the upstream side of the impulse ports for applying a lubricating film of liquid to a stream flowing through the pipe substantially continuously during measurements, said said means being flush with the interior periphery of the pipe.

2. A Venturi meter for measuring the flow of liquids carrying suspended solids comprising a pipe, a nozzle in the pipe, a porous ring set in the pipe on the upstream side of the nozzle and having the same internal diameter as the pipe, and means whereby liquid can be forced through the ring to form a lubricating envelope about a column of liquid and solid flowing through the pipe and nozzle.

3. A Venturi meter for measuring the flow of liquids carrying suspended solids comprising a vertical nozzle, piezometer rings around the nozzle, impulse ports leading from the piezometer rings to the interior of the nozzle, impulse connections to the piezometer rings below the levels of the ports and means for supplying flush water to the piezometer rings.

4. A Venturi meter for measuring the flow of liquids carrying suspended fibers comprising a vertical pipe, a nozzle in the pipe, piezometer rings around the nozzle, impulse ports in the form of slots whose lengths are several times their widths, and whose widths are parallel to the longitudinal axis of the nozzle, connecting the piezometer rings with the interior of the nozzle, impulse connections to the piezometer rings below the levels of the ports, a porous ring set in the pipe on the upstream side of the nozzle and having the same internal diameter as the pipe, and means whereby liquid can be forced through the ring to form a lubricating envelope about a column of liquid and fibers flowing through the pipe and nozzle.

5. The method of measuring the flow of liquids carrying suspended solids in a Venturi meter having impulse ports at the throat of the Venturi nozzle and at one side thereof which comprises flowing a column of the liquid and suspended solids through the nozzle and applying a lubricating envelope to the flowing column on the upstream side of said impulse ports so as to maintain a substantially uniform coefficient of friction between the walls of the nozzle and the flowing stream.

6. A Venturi meter for measuring the flow of liquids comprising a Venturi nozzle having sets of impulse ports at the throat thereof and at one side of the throat thereof, and means on the upstream side of both sets of impulse ports for substantially continuously applying a lubricating film to the flowing stream to cause a substantially uniform coefficient of friction to be maintained between the walls of the nozzle and the flowing stream.

7. A Venturi meter for measuring the flow of liquids comprising a Venturi nozzle having impulse ports at the throat thereof and at one side of the throat thereof and means on the upstream side of said impulse ports for substantially continuously applying a lubricating film to the portion of the flowing stream passing opposite the impulse ports so that a substantially uniform coefficient of friction will be maintained between the walls of the nozzle and the portion of the flowing stream passing opposite the impulse ports.

GREGORY A. PETROE.